(12) United States Patent
Nimmo

(10) Patent No.: US 9,938,166 B2
(45) Date of Patent: Apr. 10, 2018

(54) WATER SANITATION APPARATUS

(71) Applicant: Craig Nimmo, Buderim (AU)

(72) Inventor: Craig Nimmo, Buderim (AU)

( * ) Notice: Subject to any disclaimer, the term of this patent is extended or adjusted under 35 U.S.C. 154(b) by 189 days.

(21) Appl. No.: 15/004,045

(22) Filed: Jan. 22, 2016

(65) Prior Publication Data
US 2016/0221840 A1    Aug. 4, 2016

(30) Foreign Application Priority Data

Jan. 29, 2015   (AU) ................ 2015900247

(51) Int. Cl.
 *C02F 1/32*   (2006.01)
 *C02F 1/78*   (2006.01)
 *C02F 103/42*   (2006.01)

(52) U.S. Cl.
 CPC ........... *C02F 1/325* (2013.01); *C02F 1/78* (2013.01); *C02F 2103/42* (2013.01); *C02F 2201/3223* (2013.01)

(58) Field of Classification Search
 CPC .... C02F 1/325; C02F 1/78; C02F 2201/3223; C02F 2103/42
 See application file for complete search history.

(56) References Cited

U.S. PATENT DOCUMENTS

| | | | |
|---|---|---|---|
| 5,540,848 A * | 7/1996 | Engelhard ............... | C02F 1/325 210/192 |
| 2012/0051977 A1* | 3/2012 | Boodaghians .......... | C02F 1/325 422/117 |

\* cited by examiner

*Primary Examiner* — Lucas Stelling
(74) *Attorney, Agent, or Firm* — Abelman, Frayne & Schwab

(57) ABSTRACT

Sanitation apparatus including: a treatment chamber having a chamber wall, an inlet penetrating the chamber wall for receiving liquid into the treatment chamber and an outlet penetrating the chamber wall remote from the liquid inlet for discharge of liquid from the treatment chamber; an expanded portion in the chamber wall adjacent the inlet; a cylindrical portion in the chamber wall intermediate the expanded portion and the outlet; a gas injector penetrating the chamber wall in the expanded portion for injecting gas into the chamber; and UV irradiation means mounted to the chamber wall and extending through the expanded portion and the cylindrical portion for irradiating at least part of the chamber.

6 Claims, 2 Drawing Sheets

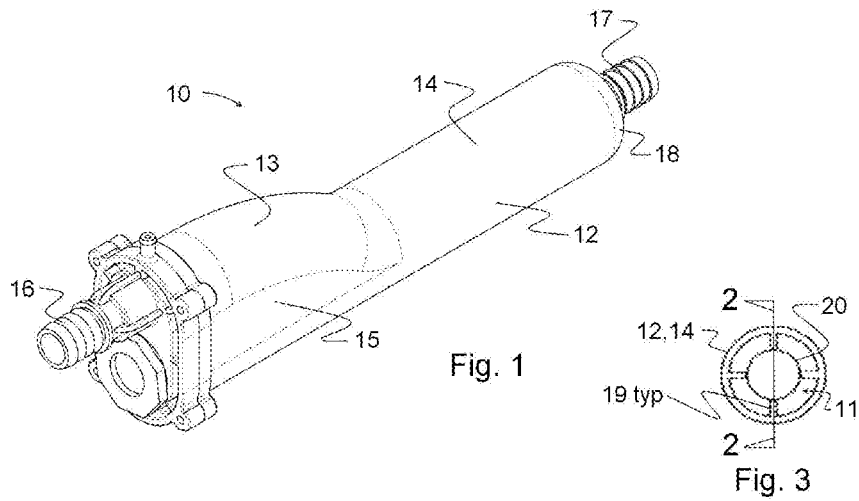
Fig. 1
Fig. 3
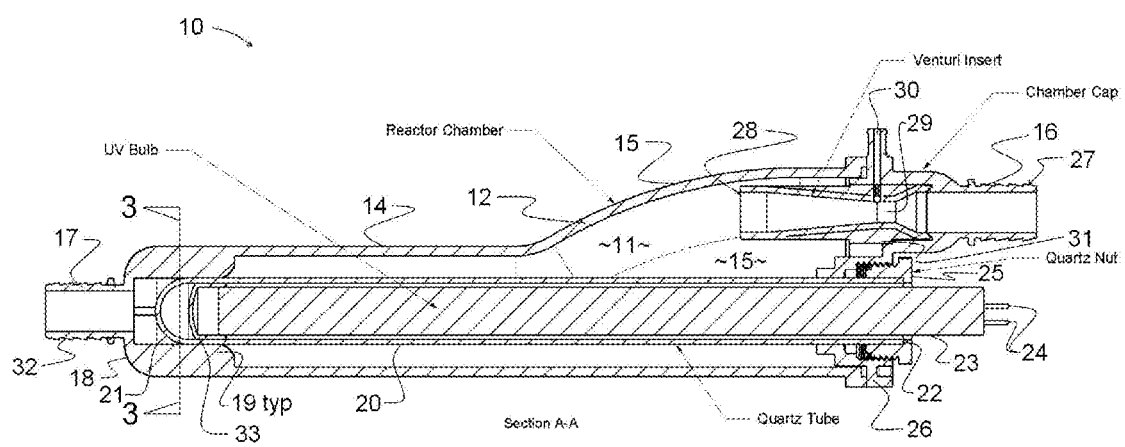
Fig. 2
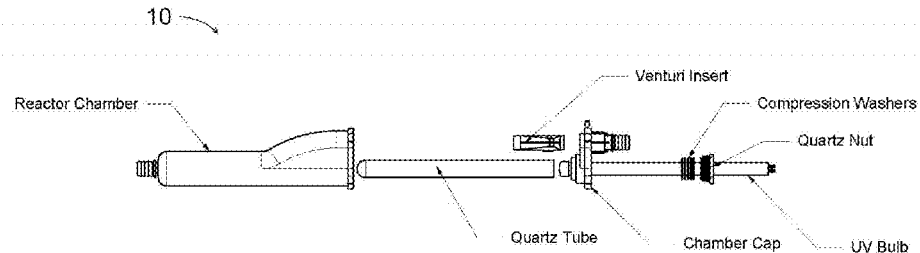
Fig. 4

WATER SANITATION APPARATUS

BACKGROUND OF THE INVENTION

This invention relates to water sanitation apparatus. The invention has particular application to water sanitation apparatus for sanitizing water in spa baths or spa pools. However, the water sanitation apparatus according to the present invention may have application in other areas requiring sanitization of water.

The term "sanitation" and "sanitization" as used herein refers to the treatment of water for human immersion by the removal of contaminants, particularly biological agents, which may produce an adverse reaction in humans when exposed thereto, such as bacteria, viruses or the like. The waters contained in spas, swimming pools and similar recreational facilities is sanitised to prevent the spreading of disease. The most common form of treatment is chlorination, which is very effective, but users may find the odour of chlorine which results from chlorination disagreeable.

There are some contaminants in water which resist sanitation by chlorination, and other sanitation agents have been found very effective, such as ozonation and UV irradiation. However, ozonation also produces unpleasant odours and UV irradiation does not have any significant residual effect outside the irradiation chamber. It has been suggested that ozonation combined with UV irradiation may provide superior sanitation, but would require two separate treatments.

Prior art systems purport to teach the sanitation of water using ozone by relying on ozone production as a result of UV irradiation. Such systems are not well known in the art. While it may be the case that ozone may be produced by UV irradiation under some conditions, the production of ozone is haphazard at best and cannot be controlled. The ozone so produced is a by-product of UV irradiation. In some systems, it may be produced when the UV passes through air, and so it may be fed into the water, almost as an afterthought, to aid in sanitation of the water. The production of ozone in such systems is haphazard at best and is normally not even measurable.

The present invention aims to provide sanitation apparatus which ameliorates the problems of the prior art and/or is reliable and efficient in use. Other advantages of the invention may become apparent from the following description.

BRIEF SUMMARY OF THE INVENTION

With the foregoing in view, in one aspect the present invention resides broadly in sanitation apparatus including:

a treatment chamber having a chamber wall, an inlet penetrating the chamber wall for receiving liquid into the treatment chamber and an outlet penetrating the chamber wall remote from the liquid inlet for discharge of liquid from the treatment chamber;

an expanded portion in the chamber wall adjacent the inlet;

a cylindrical portion in the chamber wall intermediate the expanded portion and the outlet;

a gas injector penetrating the chamber wall in the expanded portion for injecting gas into the chamber; and UV irradiation means mounted to the chamber wall and extending through the expanded portion and the cylindrical portion for irradiating at least part of the chamber.

Preferably, the inlet includes a restriction such that gas, such as ozone, may be injected into liquid passing through the inlet by a venturi effect. More preferably, the restriction and gas injector are in the form of an integral venturi tube which may be removed and replaced in the expanded portion of the chamber. In such form, the venturi tube passes part way into the expanded portion of the chamber, and is referred to hereinafter as the inlet assembly.

Preferably, the UV irradiation means includes a UV transmissible tube passing through the expanded portion and cylindrical portion of the chamber, the tube being closed at one end and open at the other. A UV irradiation tube is insertable into the tube through the open end. Preferably, the tube is supported at each end, being inserted into the chamber through a tube mounting at or adjacent the open end and supported by formations extending inward from the chamber wall at or near the closed end. In such form, tube mounting is adjacent the inlet assembly and the formations are at or near the outlet. The tube is preferably cylindrical, the passage through which the liquid may pass being substantially annular through the cylindrical portion of the chamber.

In use, ozone is at least partly absorbed into liquid in or passing through the chamber simultaneously with irradiation of the liquid by UV radiation. Suitably the UV radiation is in the band known as UV-C, that is, electromagnetic radiation in the band 100 to 280 nanometers.

In order that the invention may be more readily understood and put into practical effect, reference will now be made to the following drawings which illustrate a preferred embodiment of the invention.

BRIEF DESCRIPTION OF THE DRAWINGS

FIG. 1 is a pictorial view of sanitation apparatus according to the invention;

FIG. 2 is a cross-sectional view of the sanitation apparatus of FIG. 1 along line 2-2 of FIG. 3;

FIG. 3 is a cross sectional view of the sanitation apparatus of FIG. 1 along line 3-3 of FIG. 2;

FIG. 4 is an exploded view of the sanitation apparatus of FIG. 1; and

DETAILED DESCRIPTION OF THE DRAWINGS

Figure 5:
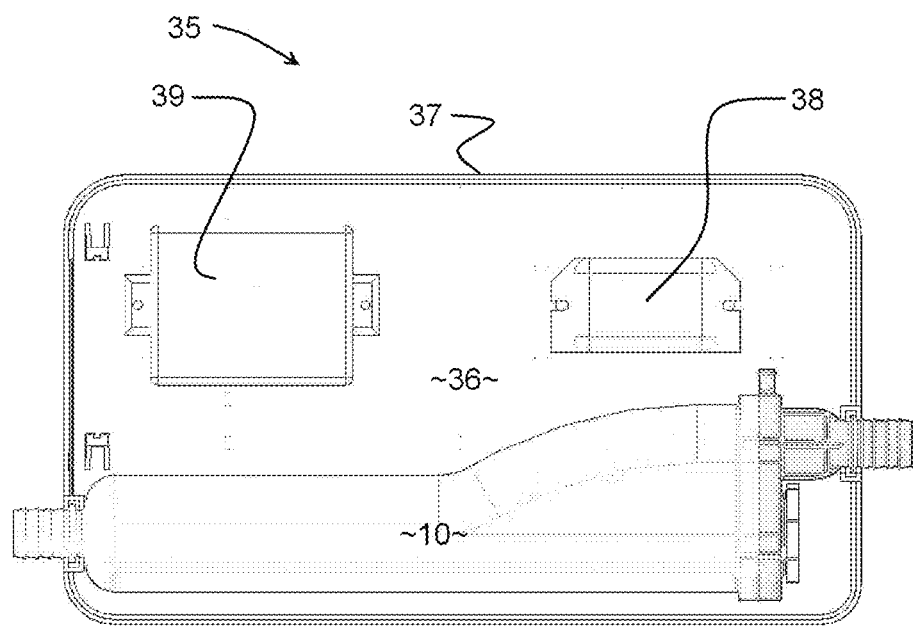
FIG. 5 is a diagrammatic elevation of the sanitation apparatus of FIG. 1 assembled into a water sanitation assembly.

The sanitation apparatus 10 illustrated in FIGS. 1 to 5 includes a reaction chamber 11 surrounded by a chamber wall 12 having an expanded portion 13 and a cylindrical portion 14. The expanded portion expands radially in one direction from the centreline of the cylindrical portion such that there are two flat portions 14, one of which is visible in FIGS. 1, 2 and 4. This form provides that the expanded portion is substantially obround in section and the cylindrical portion is substantially circular in section.

An inlet port 16 is provided at the expanded portion end of the reaction chamber, penetrating the chamber wall in that part of the expanded portion which projects radially from the cylindrical portion. An outlet port 17 is provided at the other end of the reaction chamber, penetrating the chamber wall through a transition portion 18 which is hemispherical or torispherical in form. The inlet and outlet ports each include or incorporate a barbed spigot for connection to feed and discharge lines respectively. Four support vanes shown typically at 19 in FIG. 3 project substantially radially and substantially equidistantly into the reaction chamber, each angularly displaced from its adjacent vane by 90°.

The vanes have inner edges which support a UV transparent tube 20 illustrated in particular in FIGS. 2 and 3, which tube extends from a closed end 21 near the outlet to an open end 22 adjacent the inlet. An ultraviolet lamp 23 is mounted in the passage of the tube and has four electrical connections 24, two of which are visible, for connection to a power supply. The UV transparent tube is retained in position by a quartz nut 25.

The quartz nut is threadedly engaged with a threaded aperture of a closure plate 26 which is formed to provide a sealed closure of the end of the chamber at the expanded portion end. The lamp is held in place near the open end by virtue of an aperture through the quartz nut and at the other end by a retaining cap 33. An inlet spigot 27 is integrally formed with the closure plate, projecting therefrom to provide barbs for retaining a hose or the like to be attached to the inlet port. The spigot assembly receives a venturi assembly 28 into a socket formed into the inside face of the closure plate in axial alignment with the inlet spigot of the inlet port.

The venturi assembly has a restriction 29 intermediate its ends, but closer to the inlet end and an ozone port 30 at right angles to the axis of the venturi assembly at the axial position therealong at the outlet end of the narrowest part of the restriction. A key 31 orientates the venturi assembly with respect to the closure plate so that the passage with forms the ozone port is aligned coaxially through the venturi assembly and the closure plate. The outlet port also has a barbed outlet spigot 32 in similar fashion to the inlet port.

The sanitation assembly 35 illustrated in FIG. 5 comprises the sanitation apparatus illustrated and described with reference to FIGS. 1 to 4 mounted to a mounting plate 36 within a box 37, the cover of which has been removed to reveal its contents and other components described hereinafter. The mounting plate is rectangular with rounded corners, and the cover also has rounded edges. The sanitation assembly further comprises an electrical ballast 38 is mounted to the mounting plate above the expansion portion of the sanitation apparatus to provide electrical ballast for the UV lamp by electrical connections (not shown). An ozone supply 39 is mounted to the mounting plate above the cylindrical portion of the sanitation apparatus for the supply of ozone to the ozone port of the venturi assembly.

It will be seen that the sanitation apparatus according to the present invention provides for the simultaneous ozonation and UV irradiation of fluid, specifically, water, flowing through the reaction chamber. The amount and purity of the ozone can be controlled, the rate being, for example, 50 mg to 100 mg per hour.

Although the invention has been described with reference to a specific example, it will be appreciated by persons skilled in the art that the invention may be embodied in other forms within the broad scope and ambit of the invention as herein set forth and defined by the following claims.

Claims defining the invention are as follows:

1. Sanitation apparatus including:
    a treatment chamber having a chamber wall, the treatment chamber having a cylindrical portion being elongate along a central axis, with an inlet for receiving liquid into the treatment chamber penetrating the chamber wall at one end of the treatment chamber and an outlet for discharging of liquid from the treatment chamber penetrating the chamber wall at the opposite end of the treatment chamber and along the central axis;
    an expanded portion in the chamber wall adjacent the inlet and eccentric from the central axis;
    the cylindrical portion of the chamber wall intermediate the expanded portion of the chamber wall and the outlet, the cylindrical portion being substantially concentric about the central axis;
    an ozone supply for supplying ozone gas at a controllable rate;
    an venturi tube insert located in the expanded portion of the chamber, the venturi tube insert having a major axis along a liquid flow direction, the major axis is substantially parallel to, and radially outward from, the central axis, and a gas injector penetrating the expanded portion of the chamber wall for injecting the ozone gas from the ozone supply into the expanded portion of the treatment chamber via the venturi tube insert; and
    UV irradiation means mounted to the chamber wall and extending through the expanded portion and the cylindrical portion for irradiating at least part of the treatment chamber.

2. The sanitation apparatus according to claim 1, wherein the gas injector aligns with an opening of the venturi injector to supply ozone gas at a restriction of the venturi insert.

3. The sanitation apparatus according to claim 2, where the venturi insert is received into a socket formed in the chamber wall of the inlet end.

4. The sanitation apparatus according to claim 1, wherein the UV irradiation means includes a UV tube transmissible tube passing through the expanded portion and the cylindrical portion of the treatment chamber substantially coaxial with the central axis of the cylindrical portion, the tube having a closed end and an open end opposed to the closed end for receiving a UV irradiation tube.

5. The sanitation apparatus according to claim 4, wherein the UV irradiation tube is supported at each end, being inserted into the chamber through a tube mounting at or adjacent the open end and supported by formations extending inward from the chamber wall at or near the closed end.

6. The sanitation apparatus according to claim 5, wherein the tube mounting is adjacent the expanded portion of the chamber and the formations are at or near the outlet, the tube being cylindrical and the passage through which the liquid may pass being substantially annular about the UV irradiation tube through the cylindrical portion of the treatment chamber.

* * * * *